US012762494B2

(12) United States Patent
Alemante et al.

(10) Patent No.: US 12,762,494 B2
(45) Date of Patent: Oct. 13, 2026

(54) SYSTEM AND METHODS FOR RISK AND RISK PRECURSOR IDENTIFICATION IN COMMERCIAL AVIATION OPERATIONS

(71) Applicant: United States of America as represented by the Administrator of NASA, Washington, DC (US)

(72) Inventors: Fasil Alemante, Williamsburg, VA (US); Rami B. Houssami, Reston, VA (US); Vincent E. Houston, Hampton, VA (US); Bryan L. Matthews, Soquel, CA (US); Dominic Alistair Thando McConnachie, Maynard, MA (US); Peter C. Mehlitz, San Jose, CA (US); Nikunj C. Oza, San Jose, CA (US); Farley K. Reynolds, II, Norfolk, VA (US); John P. Sarle, Norfolk, VA (US); Chad L. Stephens, Poquoson, VA (US); Shannon L. Walker, Norfolk, VA (US); Milad Memarzadeh, San Jose, CA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 18/618,690

(22) Filed: Mar. 27, 2024

(65) Prior Publication Data

US 2024/0330819 A1 Oct. 3, 2024

Related U.S. Application Data

(60) Provisional application No. 63/454,783, filed on Mar. 27, 2023.

(51) Int. Cl.
*G06Q 10/06* (2023.01)
*G06F 9/54* (2006.01)
*G06Q 10/0635* (2023.01)

(52) U.S. Cl.
CPC .......... *G06Q 10/0635* (2013.01); *G06F 9/54* (2013.01)

(58) Field of Classification Search
CPC .................................................. G06Q 10/06
See application file for complete search history.

(56) References Cited

U.S. PATENT DOCUMENTS 9,542,849 B1 * 1/2017 Bertram .................. G08G 5/55
9,824,593 B1 * 11/2017 Kronfeld ................ G08G 5/26
(Continued)

FOREIGN PATENT DOCUMENTS

EP 3901859 A1 * 10/2021 ............ G06F 16/29
WO WO-2024206567 A1 * 10/2024 .............. G08G 5/26

OTHER PUBLICATIONS

Nikunj C. Oza et al. "Enabling Safety from Data: Machine Learning/Artificial Intelligence for In-Time Aviation Safety", NASA/TM-20210018418, 2021.

(Continued)

*Primary Examiner* — Kurtis Gills
(74) *Attorney, Agent, or Firm* — Robin W. Edwards; M. Bruce Harper

(57) ABSTRACT

System and methods for risk and risk precursor identification in commercial aviation operations according to various aspects of the present invention operate in conjunction with a source of operation flight track data, a set of risk determination models containing instructions on how to process a set of received operational flight track data, a risk determination API for activating one or more risk models to process the set of received operational flight track data, and (Continued)

a user interface for communicating with the risk determination API. Each risk model may be trained to analyze flight track data to identify a particular type of risk precursor or identify a type of risk and any precursors that led to the risk. Processed results and identified risk precursors are forwarded to the user interface and displayed to allow users to quickly distinguish between nominal conditions for an aircraft and conditions with elevated levels of risk.

20 Claims, 5 Drawing Sheets

(56) References Cited

U.S. PATENT DOCUMENTS

| | | | | |
|---|---|---|---|---|
| 2018/0225976 | A1* | 8/2018 | Rinehart | G06N 7/01 |
| 2021/0333808 | A1* | 10/2021 | Ortlieb | G05D 1/106 |
| 2022/0319712 | A1* | 10/2022 | Austin | G16H 50/30 |
| 2024/0112562 | A1* | 4/2024 | Sicconi | G07C 5/085 |

OTHER PUBLICATIONS

Ezequiel Juarez Garcia et al. “Detecting Risk and Anomalies in Airplane Dynamics Through Entropic Analysis of Time Series Data”, AIAA Aviation, 2022.
Ezequiel Juarez Garcia et al. “Capturing Multivariate Time Series Interactions to Detect High-Risk Instability During Approach”, AIAA Aviation, 2023.
Nikunj C. Oza et al. “Assessment of Some IASMS-relevant Data Sources for Aviation Safety” NASA/TP-20240011784, 2024.
Chad L. Stephens et al. “Gap Analysis for the Development of an IASMS for Commercial Aviation Operations”, NASA/TM-20240012528, 2025.

* cited by examiner

SYSTEM AND METHODS FOR RISK AND RISK PRECURSOR IDENTIFICATION IN COMMERCIAL AVIATION OPERATIONS

CROSS-REFERENCES TO RELATED APPLICATIONS

This application claims the benefit of U.S. Provisional Patent Application No. 63/454,783, filed Mar. 27, 2023, and incorporates the disclosure of the application by reference.

STATEMENT REGARDING FEDERALLY SPONSORED RESEARCH OR DEVELOPMENT

The invention described herein was made in the performance of work under NASA contracts and by employees of the United States Government and is subject to the provisions of the National Aeronautics and Space Act, Public Law 111-314, § 3 (124 Stat. 3330, 51 U.S.C. Chapter 201) and 35 U.S.C. § 202, and may be manufactured and used by or for the Government for governmental purposes without the payment of any royalties thereon or therefore. In accordance with 35 U.S.C. § 202, the contractor elected not to retain title.

BACKGROUND OF THE TECHNOLOGY

The System Wide Information Management (SWIM) provides a single source for collection of information from air traffic control systems, weather stations, and other flight surveillance systems used to track and monitor aircraft. More specifically, SWIM comprises the navigation facilities and airports of the United States, including the information, services, rules, regulations, policies, procedures, personnel, and equipment required to manage flight operations within the United States. With the emergence of additional types of aircraft operations to the urban air mobility system, there is a need to include information about these operations into the SWIM data. In addition, due to the increased traffic there is a need to identify and predict potential risks to operations in and around airports to help increase safety.

Current efforts to identify risks associated with aviation operations requires analysts to review data processed based on simple statistics relating to a number of identified events of interest in relation to the total number of nominal flights occurring within the same time period for a predetermined location. These efforts and methods rely on easily recognizable patterns within large datasets to identify risks or require a detailed analysis of individual events to try and determine a root cause for that event. If a root cause cannot be identified, then the risk event may be viewed as an outlier and not considered in any additional analysis. When this happens, data that may otherwise provide insight into precursors for potential risk is lost. For example, an investigation into a given high risk event may not find any specific factor immediately preceding the high risk event, when in fact the high risk event may have been caused by a single event earlier in time that on its own did not fall outside of nominal operations. As a result, the event may be disregarded because it is not possible to identify any corrective actions. This creates a need for a system that is capable of not only identifying precursors for potential risk in nonobvious patterns or commonalities leading to elevated risks within large sets of data, but also converting the results into a visual format that can be quickly reviewed and understood in real-time environments.

BRIEF SUMMARY OF THE TECHNOLOGY

System and methods for detecting risks and risk precursors according to various aspects of the present invention operate in conjunction with live and historical flight operational data (e.g., flight operational quality assurance (FOQA), flight data monitoring (FDM), System Wide Information Management (SWIM) data), a risk detection modeling system able to receive SWIM data, and a front end user interface that allows users to select a risk model and view the results. A dedicated application programming interface (API) is used to facilitate communication between the risk detection modeling system and the front end user interface, and analyze the data according to the selected risk model. The risk detection modeling system receives SWIM data in response to a query from the user interface and feeds the data to the API. The API may then run an analysis of the SWIM data using machine learning techniques to identify any potential risk precursors for a given test scenario. The API may then convert the results into a visually adapted display rather than a chart of results to provide the user with an easier to understand depiction of potential risks in and around terminal areas or provide instructions to a user interface to generate the visually adapted display.

One embodiment of the technology is to provide a live, virtual, and constructive environment to quantify potential risk precursors for a predetermined set of conditions.

Another embodiment of the technology is to create a high-fidelity model that uses machine learning to identify risks that would be missed using current data review methods.

Another embodiment of the technology is for identified risk precursors to be used to resolve potential safety issues and analyze integrated risk in terminal area operations.

Another embodiment of the technology is for identified risk precursors to be used to identify potential safety issues and provide the associated information to flight operators to allow for modifications to flight operations directed at avoiding the potential safety issues.

Another embodiment of the technology is for a risk precursor detection system to provide a distributed test platform that allows users to access the basic functionality of the system from different locations via a cloud-based network.

Another embodiment of the technology is to provide a live, virtual, and constructive environment to quantify and predict potential risk precursors for real-time flight operations and provide notice to dispatchers at an early time step to try and avoid the occurrence of the risk condition.

These and other features, advantages, and objects of the present technology will be further understood and appreciated by those skilled in the art by reference to the following specification, claims, and appended drawings.

DETAILED DESCRIPTION OF EXEMPLARY EMBODIMENTS

For purposes of description herein, the terms "upper," "lower," "right," "left," "rear," "front," "vertical," "horizontal," and derivatives thereof shall relate to the technology as oriented in the corresponding figures. However, it is to be understood that the technology may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present technology may be described in terms of functional block components and various processing steps. Such functional blocks may be realized by any number of components configured to perform the specified functions and achieve the various results. For example, the present technology may employ various memory devices, processors, servers, databases, network communication protocols, and encryption systems, which may carry out a variety of operations. In addition, the technology described is merely one exemplary application for the disclosed system. Further, the present technology may employ any number of conventional techniques or methods of processing data, running simulations, comparing datasets, or manipulating any type of air system data received from a data source, memory device, or simulated data set.

Systems and methods for detecting risks and risk precursors according to various aspects of the present technology may operate in conjunction with any system or subsystem adapted for operation within the National Airspace System (NAS). Various representative implementations of the present technology may be applied to analyzing flight track data (e.g., FOQA, FDM, SWIM) in various phases of flight (e.g., taxi, take-off, en route, arrival, approach, terminal area) with consideration for implications for specific airports and weather. A system for detecting risks and risk precursors as detailed below may comprise a software platform or network that allows for different machine learning based algorithms and capabilities to be used to identify anomalies that may not be captured by current human-based observation systems and methods.

Figure 1:
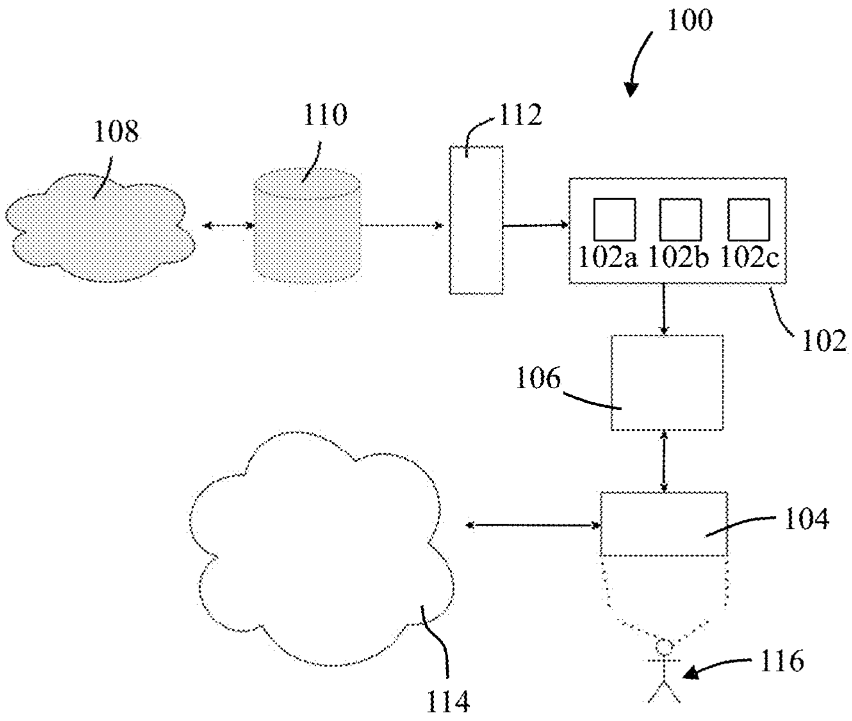
FIG. 1 representatively illustrates a block diagram of a risk detection modeling system in accordance with an exemplary embodiment of the present technology.

Referring now to FIG. 1, the system for detecting risk precursors 100 may comprise a risk detection modeling system 102, a user interface 104, and a risk determination application programming interface (API) 106 configured to facilitate communication between the risk detection modeling system 102 and the user interface 104. The risk detection modeling system 102 may comprise a plurality of risk models 102*a*, 102*b*, 102*c* configured to use machine learning (ML) techniques and algorithms to analyze operational flight data to identify precursors to a predetermined type of risk condition. Other risk models may be taught to identify both a risk and its precursor from the operational flight data.

The risk detection modeling system 102 may be configured to receive operational flight data from an archival central information sharing platform such as the System Wide Information Management (SWIM) Program 108 operated by the FAA. SWIM data may comprise any suitable operational flight data and specific information received from SWIM may be selected according to a given risk model housed within the risk detection modeling system 102. For example, a risk model directed to identifying unstable approaches may receive flight data relating to changes in or rates of vertical velocity of one or more aircraft as they begin their approaches into a given airspace or designated airport. Other data received may relate to local weather conditions, traffic congestion, flight spacing, and airspeed.

Depending on a type of risk model selected, raw SWIM data may need to be converted into a different format or parsed to only provide a desired subset of data. Alternatively, a risk model that uses historical data may send a query to a historical database 110 to request a specified set of archived SWIM data. The selected data may be passed through a parser program 112 to convert the set of data into a format (e.g., CSV (comma-separated values)) that the risk model is able to use. Similarly, the parser program 112 may be configured to remove portions of the archived data that are not required by the risk model to improve processing speed and data transfer times.

The parser program 112 may also be configured to convert received data into a usable format prior to providing the received data to the risk detection modeling system 102. Certain types of SWIM data may be originally saved with a set of standard units associated with the data type and may require an additional operational step to be usable. For example, velocity may be saved into the SWIM data sets with the units of feet/second (ft/s). If a given risk model is expecting to receive data with another set of units such as feet/minute (ft/min), then the parser program 112 may perform an adjustment to convert the data from ft/s to ft/min. Likewise, other data types such as altitude data, pressure data, and time may require an adjustment of some type.

The parser program 112 may also be configured to perform a smoothing function on data being provided to the risk detection modeling system 102. For example, data coming from SWIM may be subject to resolution issues such as numbers being rounded to the nearest whole number. For certain data that involves relatively high values such as velocity, rounding may result in values rounded to the nearest hundred (e.g., 100 ft/s). The resulting figure saved into SWIM may require a smoothing factor to eliminate values that could signal risk but are merely the result of converting a value from one set of units into another set of units within a given time step interval of data collection. In one embodiment, the parser program 112 calculates an average between two intermediate data collection intervals to smooth out the overall data.

Individual risk models 102*a*, 102*b*, 102*c* may be stored within the risk detection modeling system 102 and comprise specific types of risk modeling programs or methods of analyzing data to identify a particular type risk precursor or identify a type of risk and any precursors that led to the risk.

For example, depending on a specific type of risk or data set, a given risk model may be configured to use one or more types of analysis to generate a result or forecast.

Figure 2:
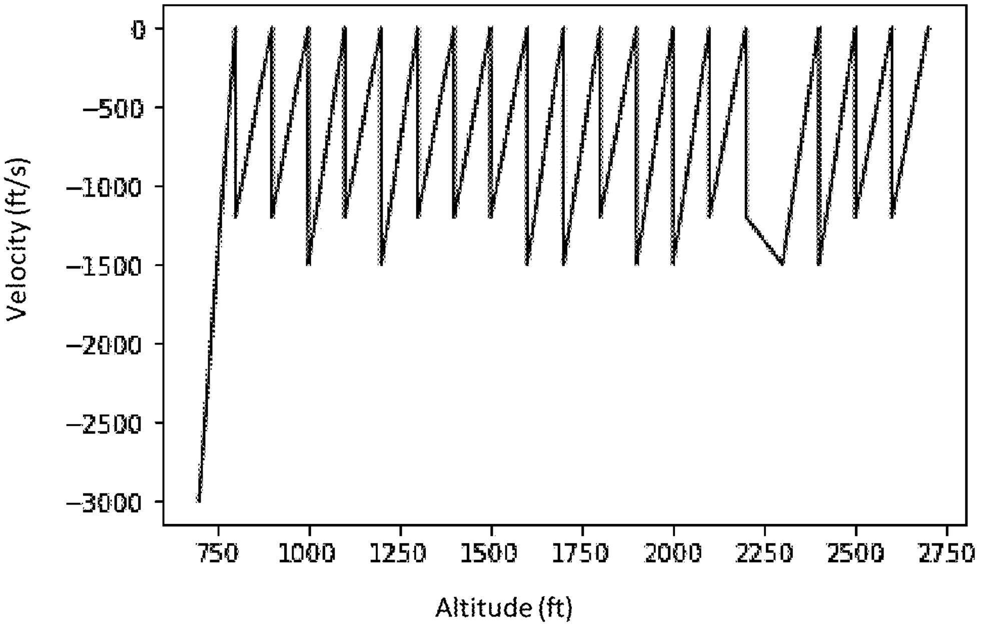
FIG. 2 representatively illustrates calculated vertical velocity in accordance with an exemplary embodiment of the present technology.

In one embodiment, a first risk model 102*a* may be adapted to predict a value or variable at a predetermined future point in time based on analyzed trend data for the same variable. In this scenario, a time series analysis may be used to determine a best fit model for a series of past values. The first risk model 102*a* may be programmed to use any suitable time series analysis or it may be adapted to test multiple discrete models and then provide a result based on the model that provides the most accurate result. For example, and referring now to FIG. 2, if the first risk model 102*a* is trained to define an unstable approach (vertical) as a descent (negative vertical velocity) of greater than 1000 ft per minute, it may be adapted to predict vertical velocity at a given time step in the future and determine if a given flight approach is at risk of an unstable approach. By separating the trend component from any stochastic component, the altitude at future time steps can be predicted and a time series analysis such as an autoregressive, integrated, and moving averages (ARIMA) model may be a useful method to capture common time variant components.

Figure 3:
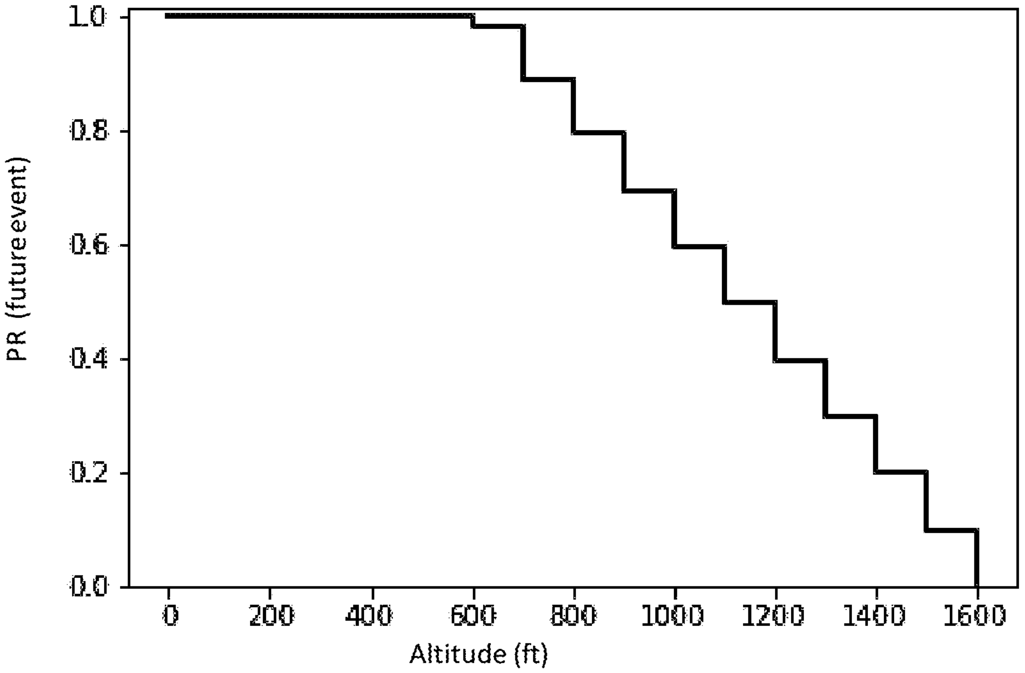
FIG. 3 representatively illustrates a survival curve plot in accordance with an exemplary embodiment of the present technology.

Referring now to FIG. 3, a second risk model 102*b* may be adapted to use a different methodology to determine a risk associated with unstable approaches by approaching the desired outcome differently. For example, the second risk model may be trained with ML to consider given what is known about previous flights up to this point (i.e., time step, altitude, and descent velocity), what is the likelihood of this flight ending with an unstable approach? This method may use an empirical cumulative distribution function to determine a likelihood of a failure state at a future time based on current conditions. The results may be plotted in a manner that is easy to interpret and is able to be visualized well.

Figure 4:
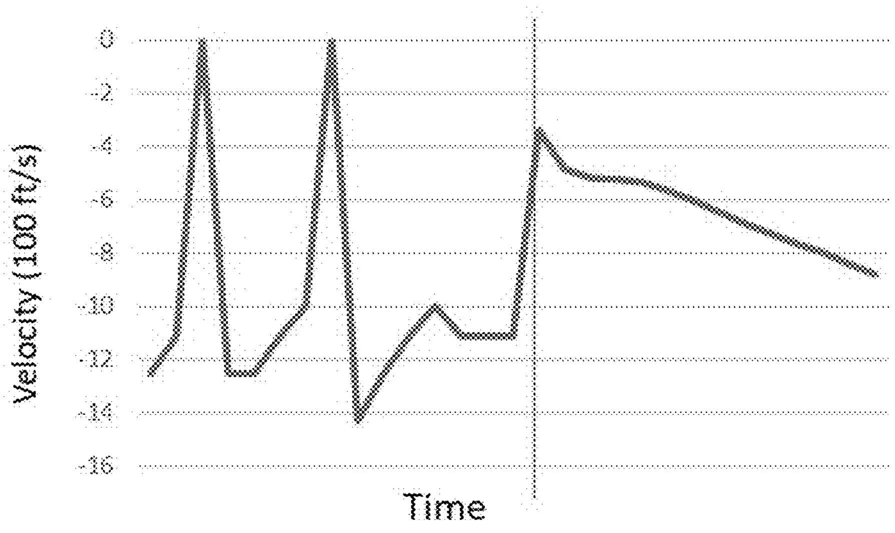
FIG. 4 representatively illustrates a predicted flight condition in accordance with an exemplary embodiment of the present technology.
Figure 5:
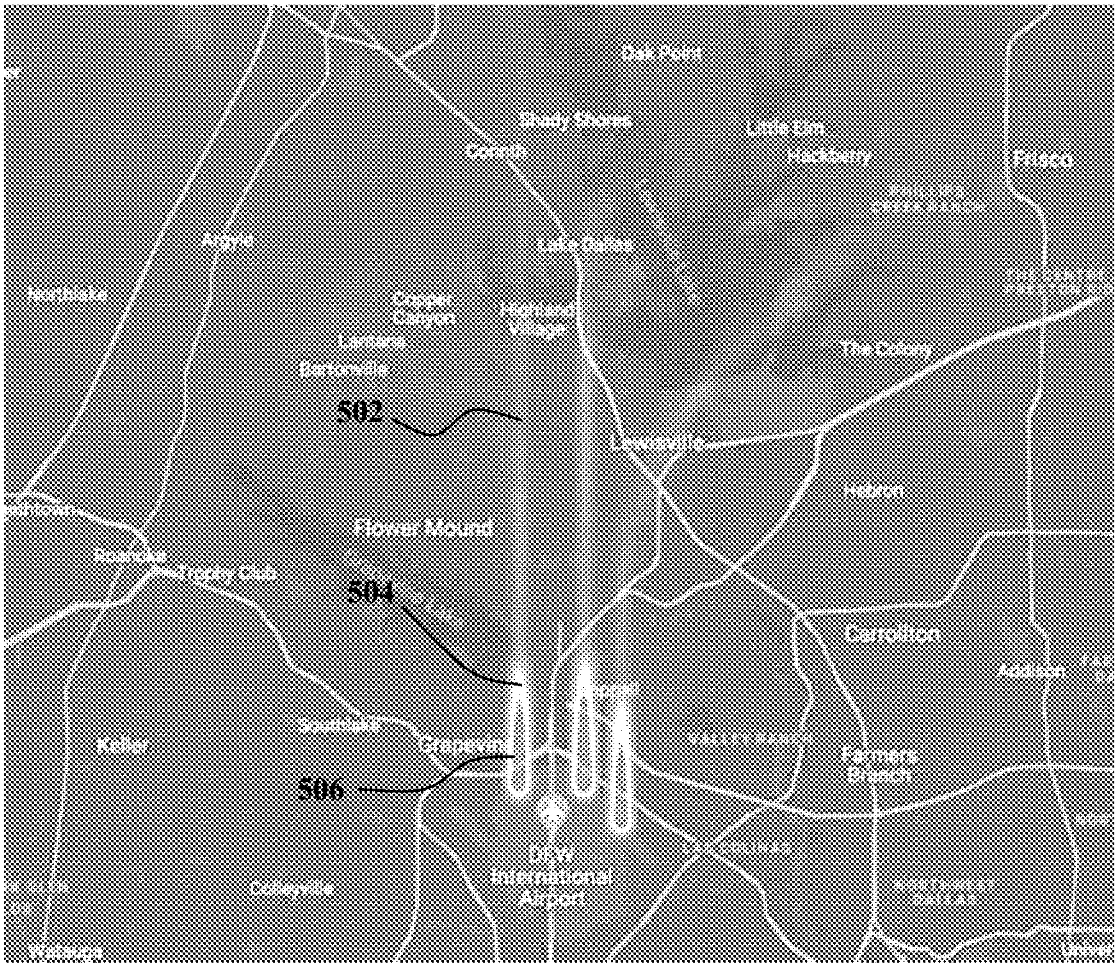
FIG. 5 representatively illustrates a heat map in accordance with an exemplary embodiment of the present technology.

Referring now to FIG. 4, in yet another example, a third risk model 102*c* may be trained to use a type of sequence-to-sequence neural network that is well suited to the problem space. The model may incorporate learning long order (time) dependence to work like an autoencoder that encodes/decodes temporal relationships. In one embodiment, the third risk model 102*c* may be trained based on nominal sample data and non-nominal data such that based on the past x number of past time steps (e.g., to the left of vertical line), the model may then predict y future time steps (e.g., to the right of vertical line). Based on the resulting predictions, the third risk model 102*c* can determine if a given flight should be flagged for review. Again, the results may be plotted in a manner that is easy to interpret by users.

The individual risk models 102*a*, 102*b*, 102*c* may use any suitable types of ML, statistical, or state space models for a given risk scenario or data type. For example, in one embodiment, some risk models may incorporate supervised or unsupervised learning when trained on archival data. Similarly, for risk models that are adapted to receive live streaming data, self-supervised learning may be used.

Referring again to FIG. 1, the risk determination API 106 may comprise a testbed platform to provide a connectivity framework for distributed access and a common communication language between the risk detection modeling system 102 and the user interface 104. The risk determination API 106 may be used to manage how each risk model 102*a*, 102*b*, 102*c* communicates with a particular data source. For example, one risk model may be configured to receive historical SWIM data from the historical database 110 comprising flight data for individual aircraft flown in the United States. Another risk model may be configured to use specific types of real-time data as it is being generated on the operational NAS 100 and saved to the SWIM system. The risk determination API 106 may be suitably configured to direct each type of data to the corresponding risk model in response to an appropriate command or query from the user interface 104.

In one embodiment, the risk determination API 106 may be configured to communicate with one or more users 116 via the user interface 104 that are able to remotely access the system for detecting risk precursors 100 to run or analyze the results of a given risk model 102*a*, 102*b*, 102*c*. The risk determination API 106 may also be configured to function with one or more external components 114 that may be used to provide additional data or supplement the results being displayed on the user interface 104. The user interface 104 may communicate with the risk determination API 106 by any suitable method such as a cloud-based web platform or via a local or wide area network.

The risk determination API 106 may also be configured to convert or configure results from a given risk model into a visual format for display on the user interface 104. The risk determination API 106 may further be configured to offload specified tasks to the platform hosting to user interface 104 to take advantage of the distributed nature of the system. Offloading takes may also free up resources at the risk determination API 106 to allow for increased accessibility among users 116.

The user interface 104 may comprise any suitable computing platform for allowing a user 116 to access the risk determination API 106 over a communication network or other method such as a cloud-based web platform or via a local or wide area network. The user interface 104 may be adapted to function on a stationary computing platform or on a portable device capable of displaying results generated by the risk determination API 106 in response to a command from the user interface 104 selecting a desired risk model for execution.

Results displayed on the user interface 104 may be dependent on the risk model selected. In addition, the risk determination API 106 may be configured to display results in multiple formats such as a high level overview for all tracked flights or down to discrete flight paths or conditions for a single flight. In one embodiment, portions of an approaching flight path may be displayed on the user interface 104 in a manner that provides visual distinctions between conditions considered nominal and conditions indicating potentially higher level of risk. For example, a heat map may be used to display nominal regions 502 that are color coded in green to indicate a low level of risk or a lack of detected risk precursors. A second region 504 showing a higher level of identified risk may be color coded in yellow to increase visibility. Finally, regions 506 where one or more flights have experienced an actual risk condition or an indicated higher level of potential risk may be color coded (e.g., in red) to allow users 116 to easily determine areas of concern.

Figure 6:
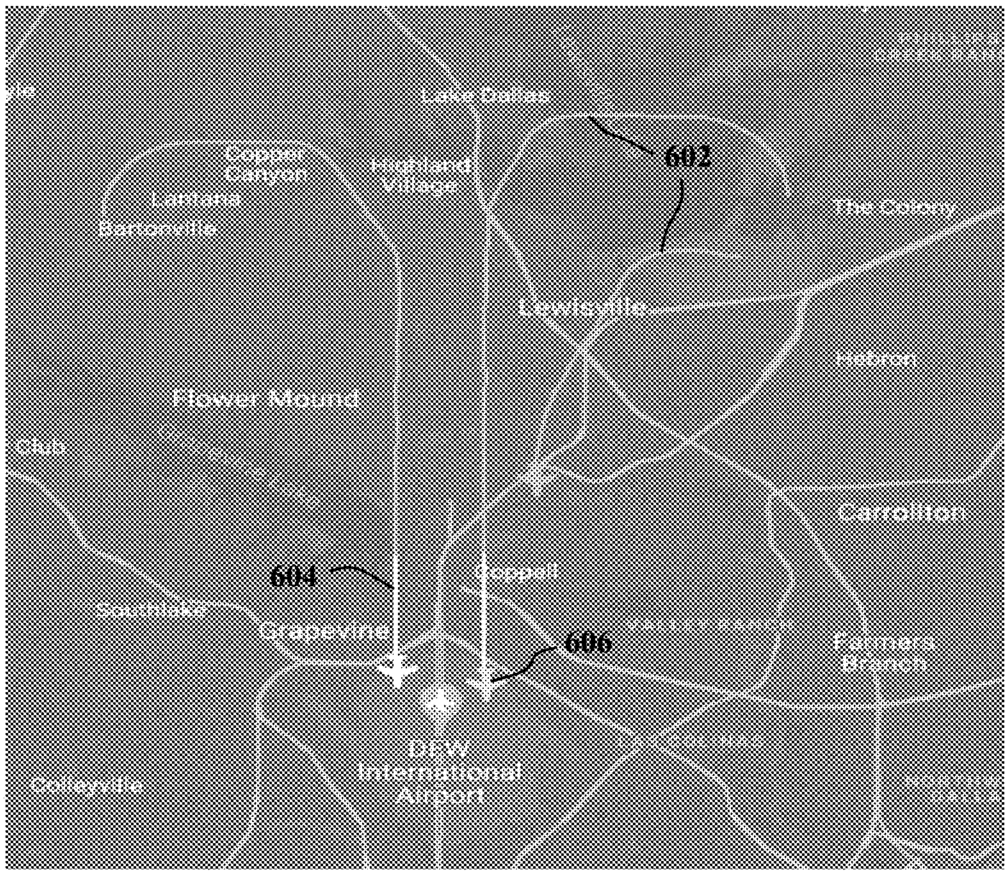
FIG. 6 representatively illustrates a set of flights paths in accordance with an exemplary embodiment of the present technology.

The risk determination API 106 may further be configured to allow users 116 to switch views to display the results in a more discrete manner. For example, and referring now to FIG. 6, a more detailed view may be accessible which displays individual flight paths for aircraft at a given time interval. As above, regions of interest may be color coded to provide a visual indication of past or expected levels of risk. A first region of low identified risk 602 may be indicated and tend to be located at distances corresponding to regions when an approach vector is just beginning. As flights get further along an approach and descend in altitude, a second region of elevated risk 604 may be indicated by a visual cue, such as being color coded in yellow. For flights that remain outside of an identified risk, the visual indication of the flight may remain yellow until the aircraft is on the ground. If, however, the data suggests that the flight is continuing along a trajectory that indicates conditions for an identified risk will be met, then the visual cue for the flight may be changed to alert the user. In this scenario, a third region of actual risk 606 may be displayed to alert the user that corrective action may be required.

Figure 7:
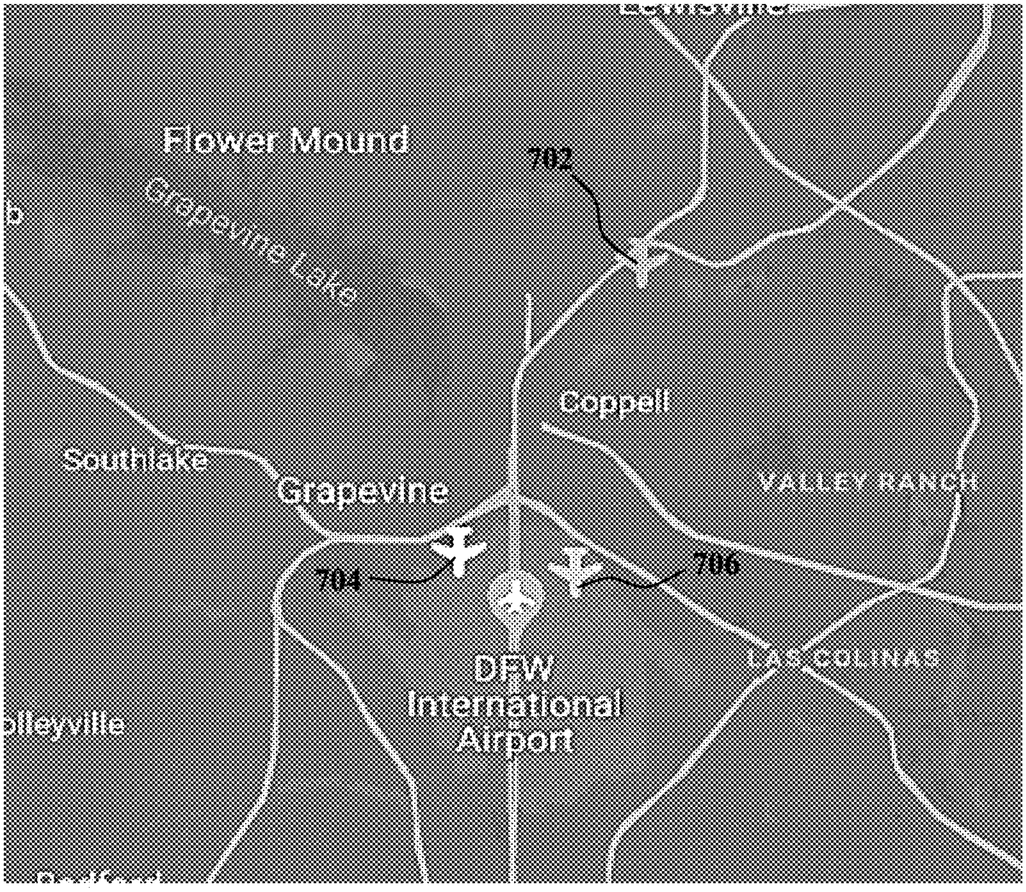
FIG. 7 representatively illustrates a set of flights in accordance with an exemplary embodiment of the present technology.

Referring now to FIG. 7, in yet another view, the risk determination API 106 may further be configured to allow users 116 to switch views to display the results based simply on a location for each aircraft being tracked. This view may display the position of the aircraft in a manner that quickly reflects the identified level of risk for that aircraft at that geographic location. As above, color coding may be used to provide a quickly distinguishable status between a nominal state 702, an elevated risk state 704, and a state where an aircraft's flight condition has met an identified risk 706. The ability to quickly identify when an aircraft has fallen outside of a nominal state 702 may allow users such as dispatchers or flight controllers to take an appropriate corrective measure more quickly than through current methods of flight tracking.

Figure 8:
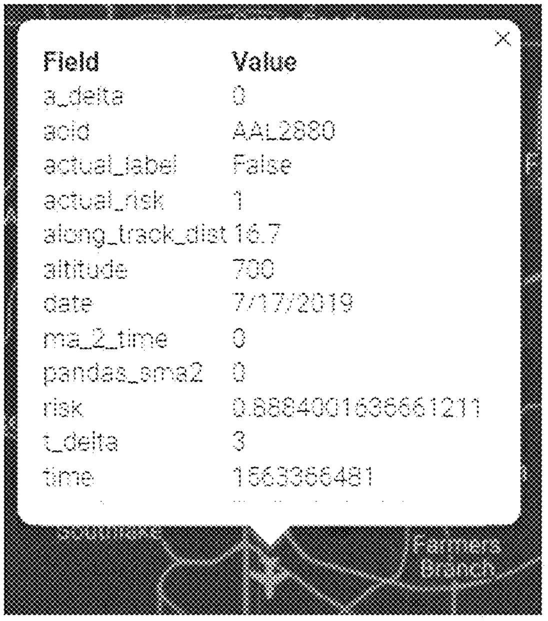
FIG. 8 representatively illustrates a set of aircraft specific flight data in accordance with an exemplary embodiment of the present technology.

With reference now to FIG. 8, the risk determination API 106 may further be configured to provide detailed information for a given flight. For example, in response to a user clicking or otherwise selecting a given flight displayed on the user interface, the risk determination API 106 may respond by opening a box displaying information specific to that aircraft as it relates to the particular type of risk being assessed. Having access to this information may help a user understand the situation more completely and better determine what type of corrective action may be required.

These and other embodiments for methods for detecting risks and risk precursors may incorporate concepts, embodiments, and configurations as described above. The particular implementations shown and described are illustrative of the technology and its best mode and are not intended to otherwise limit the scope of the present technology in any way. Indeed, for the sake of brevity, conventional processing methods, network communication, data transfer, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same. Any terms of degree such as "substantially," "about," and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

The invention claimed is:

1. A system for identifying aviation risk precursors from a source of flight track data, comprising:

- a risk detection modeling system comprising a set of selectable risk models stored within a memory device on a computing platform having one or more processors configured to execute machine learning models, wherein each selectable risk model receives a set of data from the source of flight track data and is trained to identify potential risk precursors to a predetermined type of risk condition;
- a parser executable by the computing platform and configured to improve processing speed and data transfer times by receiving a set of data from the source of flight track data and performing at least one of:
  - a removal of a portion of the set of data not required by a given selectable risk model prior to providing the set of data from the source of flight track data to the risk detection modeling system; and
  - a conversion of the received set of data into a usable format by the risk detection modeling system, wherein a smoothing function is applied to eliminate values that could signal risk but are merely the result of the conversion prior to providing to the risk detection modeling system;
- a risk determination application programming interface (API), wherein the risk determination API is configured to:
  - access the risk detection modeling system to select a risk model from the set of the selectable risk models;
  - cause the selected risk model to process the set of data received from the parser based on the selected risk model;
  - interpret the processed set of data to determine if any potential risk precursors were identified in the set of data for the selected risk model prior to conditions for any predetermined type of risk within the selected risk model being met by the flight track data; and
  - convert the interpreted processed set of data into a visual format according to the selected risk model to distinguish any potential risk precursors in the processed set of data from nominal data in the processed set of data; and a user interface in communication with the risk determination API, wherein the user interface is configured to:

access the risk determination API to send a request causing the risk determination API to select the risk model;

receive the processed set of data according to the visual format; and overlay the processed set of data according to the visual format onto a map corresponding to the selected risk model.

2. A system for identifying aviation risk precursors from a source of flight track data according to claim 1, wherein each selectable risk model uses a machine learning model to analyze the set of data from the source of flight track data by comparing the set of data to a corresponding dataset from at least one of historical data and real-time data from a second source of flight track data for a geographic location.

3. A system for identifying aviation risk precursors from a source of flight track data according to claim 2, wherein the machine learning model is trained to identify anomalies in the set of data from the source of flight track data that result in the predetermined type of risk.

4. A system for identifying aviation risk precursors from a source of flight track data according to claim 2, wherein the machine learning model is trained to identify the predetermined type of risk occurring in the set of data from the source of flight track data and to determine a precursor for the identified risk.

5. A system for identifying aviation risk precursors from a source of flight track data according to claim 1, wherein the visual format displays flight track data for both nominal data and data with identified risk precursors.

6. A system for identifying aviation risk precursors from a source of flight track data according to claim 5, wherein flight track data for nominal data is displayed in a first color and data with identified risk precursors is displayed in a second color.

7. A system for identifying aviation risk precursors from a source of flight track data according to claim 5, wherein individual flight track data may be selectable by the user interface to display detailed flight track data.

8. A method of identifying aviation risk precursors from a data source of historical operational flight track data, comprising:

providing a risk detection modeling system comprising a set of selectable risk models stored within a memory device on a computing platform having one or more processors configured to execute machine learning models, wherein each selectable risk model:

receives a set of data from the data source comprising flight data for individual aircraft flown within a geographic region; and is trained to identify potential risk precursors to a predetermined type of risk condition;

accessing the risk detection modeling system with a risk determination application programming interface (API) in response to a command from a user interface to select a risk model from the set of the selectable risk models;

removing a portion of the set of data not required by the selected risk model prior to providing the set of data from the data source to the selected risk model to improve processing speed and data transfer times;

downloading the set of data from the data source via the risk detection modeling system and processing according to the selected risk model;

interpreting the processed set of data via the risk determination API to determine if any potential risk precursors were identified in the set of processed data for the selected risk model prior to conditions for any predetermined type of risk within the selected risk model being met by the flight track data;

converting the interpreted processed set of data into a visual format for display on the user interface according to the selected risk model to distinguish any potential risk precursors from nominal data; and overlaying the visual format onto a map displayed on the user interface, wherein the map corresponds to the selected risk model.

9. A method of identifying aviation risk precursors from a data source of historical operational data according to claim 8, wherein each selectable risk model uses a machine learning model to analyze the set of data from the data source by comparing the set of data from the historical data to flight track data for each individual aircraft making up the set of historical data in the geographic location.

10. A method of identifying aviation risk precursors from a data source of historical operational data according to claim 9, wherein the machine learning model is trained to identify anomalies in the set of data from the data source that result in the predetermined type of risk.

11. A method of identifying aviation risk precursors from a data source of historical operational data according to claim 9, wherein the machine learning model is trained to identify the predetermined type of risk occurring in the set of data from the data source and to determine a precursor for the identified risk.

12. A method of identifying aviation risk precursors from a data source of historical operational data according to claim 8, wherein the visual format displays flight track data for both nominal data and data with identified risk precursors.

13. A method of identifying aviation risk precursors from a data source of historical operational data according to claim 12, wherein flight track data for nominal data is displayed in a first color and data with identified risk precursors is displayed in a second color.

14. A method for identifying aviation risk precursors from a source of real-time flight track data, comprising:

storing a set of selectable risk models within a risk detection modeling system having a memory device on a computing platform having one or more processors configured to execute machine learning models in communication with the source of real-time flight track data, wherein each selectable risk model receives and analyzes a set of data from the source of real-time flight track data and is trained to identify potential risk precursors to a predetermined type of risk condition;

accessing the risk detection modeling system with a risk determination application programming interface (API) configured to:

select a risk model from the set of the selectable risk models;

improve processing speed and data transfer times between the risk detection modeling system and the source of real-time flight track data by performing at least one of:

a removal of a portion of the set of data not required by the selected risk model prior to providing the set of data from the source of real-time flight track data to the selected risk model; and a conversion of the received set of data into a usable format by the selected risk model, wherein a smoothing function is applied to eliminate values that could signal risk but are merely the result of the conversion prior to providing to the selected risk model;

cause the selected risk model to process the received set of data based on the selected risk model;

interpret the processed set of data to determine if any potential risk precursors were identified in the received set of data for the selected risk model prior to conditions for any predetermined type of risk within the selected risk model being met by the flight track data; and generate instructions to convert the interpreted processed set of data into a visual format according to the selected risk model to distinguish any potential risk precursors in the processed set of data from nominal data from the processed set of data; and accessing the risk determination API with a user interface configured to:

send a request causing the risk determination API to select the risk model;

receive the processed set of data according to the generated instructions; and overlay the processed set of data according to the visual format onto a map corresponding to the selected risk model.

15. A method for identifying aviation risk precursors from a source of real-time flight track data according to claim 14, wherein each selectable risk model uses a machine learning model to analyze the set of data from the source of real-time flight track data by comparing the set of data to a corresponding dataset from at least one of historical data and real-time data from a second source of flight track data for a geographic location.

16. A method for identifying aviation risk precursors from a source of real-time flight track data according to claim 15, wherein the machine learning model is trained to identify anomalies in the set of data from the source of flight track data that result in a predetermined type of risk.

17. A method for identifying aviation risk precursors from a source of real-time flight track data according to claim 15, wherein the machine learning model is trained to identify a predetermined type of risk occurring in the set of data from the source of flight track data and to determine a precursor for the identified risk.

18. A method for identifying aviation risk precursors from a source of real-time flight track data according to claim 14, wherein the visual format displays flight track data for both nominal data and data with identified risk precursors.

19. A method for identifying aviation risk precursors from a source of real-time flight track data according to claim 18, wherein flight track data for nominal data is displayed in a first color and data with identified risk precursors is displayed in a second color.

20. A system for identifying aviation risk precursors from a source of real-time flight track data according to claim 18, wherein individual flight track data may be selectable by the user interface to display detailed flight track data.

* * * * *